No. 654,059. Patented July 17, 1900.
A. H. GRAVES.
HAY RAKE AND STACKER.
(Application filed Mar. 16, 1900.)
(No Model.) 2 Sheets—Sheet 2.
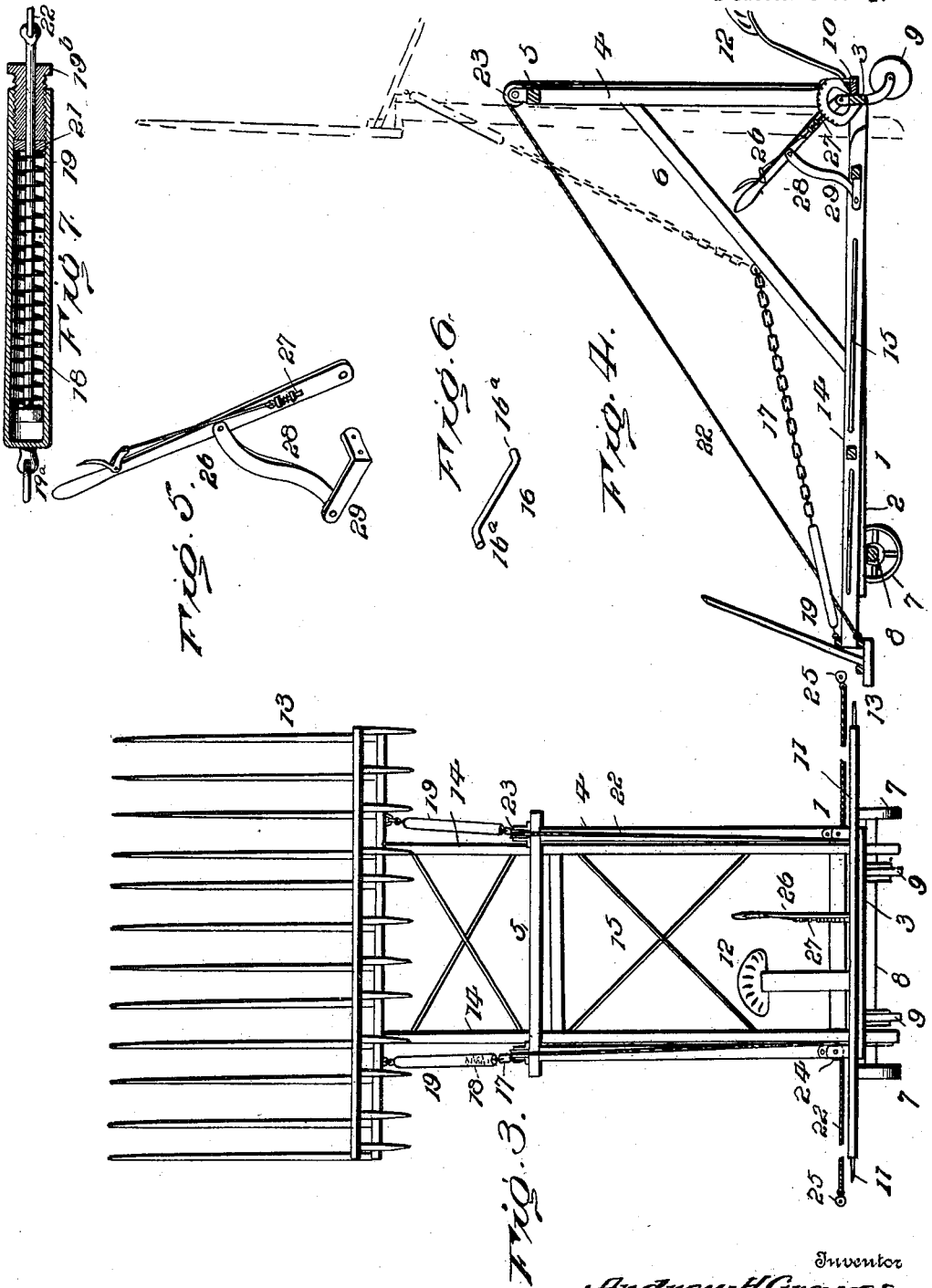

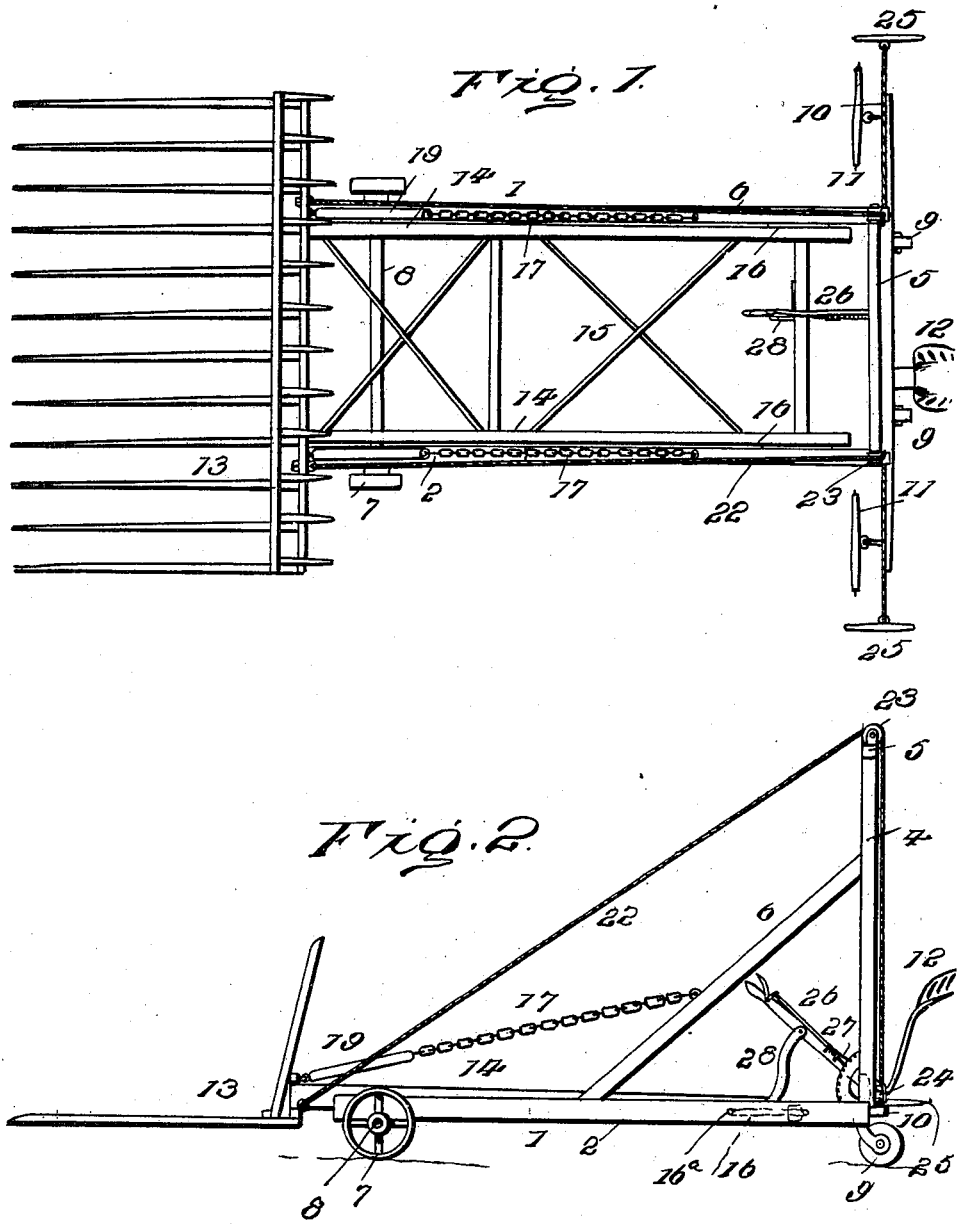

UNITED STATES PATENT OFFICE.

ANDREW H. GRAVES, OF PLEASANTON, IOWA.

HAY RAKE AND STACKER.

SPECIFICATION forming part of Letters Patent No. 654,059, dated July 17, 1900.

Application filed March 16, 1900. Serial No. 9,007. (No model.)

*To all whom it may concern:*

Be it known that I, ANDREW H. GRAVES, a citizen of the United States, residing at Pleasanton, in the county of Decatur and State of Iowa, have invented certain new and useful Improvements in Hay Rakes and Stackers; and I do hereby declare the following to be a full, clear, and exact description of the invention, such as will enable others skilled in the art to which it appertains to make and use the same.

This invention relates to certain new and useful improvements in hay rakes and stackers of that type in which the rake is carried by swinging arms mounted to move in the arc of a circle from a substantially-horizontal to a substantially-vertical position. In the operation of stackers of this type more or less difficulty is encountered and loss of time experienced in regulating the action of the moving parts on account of the liability of the rake to hang at the limit of its upward and downward movements or loading and discharge positions, requiring great power at the outset of the elevating operation to start the rake upon its upward movement and a manual partial retraction of the rake to draw it past the center, so as to allow it to descend again to a horizontal position for reloading. In transporting the hay also from the point of loading to the point of deposit it is necessary to elevate the rake above the surface of the ground in order to prevent injury thereto, and this has also been heretofore accomplished by either sustaining the rake by means of the elevating draft mechanism or manually elevating and securing it in the desired position by suitable fastening means. Both of these expedients are objectionable, the former on account of the strain thrown upon the frame and cables and the latter on account of the manual labor and loss of time involved in lifting the rake and applying the fastening means.

The object of my invention is to obviate these objections by the provision of a simple and effective means for automatically partially retracting the rake to prevent the same from hanging at the discharge position and mechanism whereby the partial or complete elevation of the frame may be effected by the driver from his seat at the rear of the frame; also, to generally simplify and improve the construction and increase the practical efficiency of stackers of this character.

With the accomplishment of these ends in view the invention consists of certain novel features of construction, combination, and arrangement of parts, as will be hereinafter more fully described, and particularly pointed out in the appended claims.

In the accompanying drawings, Figure 1 is a plan view of a hay rake and stacker constructed in accordance with my invention. Fig. 2 is a view in side elevation of the same. Fig. 3 is a rear elevational view. Fig. 4 is a vertical longitudinal section showing in full and broken lines the movements of the rake and lever mechanisms. Fig. 5 is a detail view of the lever mechanism and coöperating parts. Fig. 6 is a perspective view of one of the swinging pivots. Fig. 7 is a view of the tension-adjusting device for the retractile springs.

Referring now more particularly to the drawings, the numeral 1 represents the main frame of the stacker, which may be of the ordinary or any approved construction, the same consisting, as shown in the present instance, of longitudinal side bars 2, a cross-bar 3, connecting said side bars at their rear ends, standards 4, rising from the side bars at the rear of the frame, a transverse top rail 5 connecting the upper ends of the standards, and inclined braces 6, connecting the side bars and standards to stay and support the latter, as in the ordinary construction of devices of this character. The frame thus constructed is mounted at its front end upon ground-wheels 7, carried by a shaft 8, connecting the side bars, and at its rear end upon caster-wheels 9. The stacker is thereby adapted to be drawn from place to place with ease and facility and turned as desired. A draft-bar or doubletree 10 is rigidly applied at the rear of the frame and projects at each end beyond the opposite sides thereof, and to these projecting ends of the draft-bar are attached singletrees 11, to which the draft-animals are hooked up. The singletrees face toward the front of the frame, and the pull of the draft-animals results in the stacker being pushed forward in a manner readily understood. A seat 12 is mounted upon the cross-bar 3 between the standards in convenient position to enable the driver to control both draft-animals. The use of a single draft-animal on each side of the stacker is ordinarily sufficient; but two or more may be employed, if desired, and the arrangement of draft mechanism varied accordingly.

The rake 13 is of the ordinary construction and is rigidly mounted upon the forward ends of a pair of elevating-arms 14. These arms are suitably connected and braced by cross-rods 15 and are spaced apart the proper distance to fit down between and move in close relation to the inner faces of the side bars 2. At their rear ends the said arms are pivotally connected to the side bars by pivot-rods 16, each of said pivot-rods having oppositely-projecting lateral bearing-arms 16$^a$, which are respectively journaled in the arm and adjacent bar, as shown. These rods form swinging pivotal connections for the elevating-arms and adapt the same to move in an arcuate path with ease and smoothness and without the objectionable torsional strain set up by pivot connections of the type commonly employed, such as bolts and rigid cross-rods.

In their normal or loading position the elevating-arms and rake are disposed horizontally, as usual, and as shown in full lines in Figs. 1 and 4, and in elevating and discharging the load move upwardly and rearwardly to a point slightly beyond the perpendicular, as shown in broken lines in the last-named figure. To limit this upward movement of the aforesaid parts and prevent the same from moving too far rearwardly and abutting with too much force against the top rail 5, it has been customary to employ chains, ropes, or cables; but these soon elongate or stretch and defeat the object of their provision. Hence the frame is subjected to violent concussion each time unloading is effected, and at the same time the rake mechanism often hangs and must be moved back past the center manually before it can be loaded. To obviate these objections, I provide at any desired point in the continuity of each of the limitation cords, ropes, chains, or cables 17, constituting stays connecting the elevating-arms of the rake with the braces 6, a retractile-spring, 18 which forms a compensating connection designed to allow the rake to move directly against the cross-bar to facilitate unloading, but at the same time to ease the shock of contact, and when the rake is unloaded to partially retract or draw the same back to a perpendicular position by its spring tension, so that the rake may be readily lowered to its normal or loading position. For obvious reasons I prefer to locate the springs at the forward ends of the stays and connect them to the rake-head, and to render the operation more effective I contemplate in practice employing adjusting mechanism for regulating the tension of the spring. This may consist of a holder or container 19 for the spring and a headed rod 21, against which the spring bears, an adjustable stop 19$^b$ for one end of the spring and having threaded connection with the holder, and a connection 19$^a$ between the holder and the rake-head; but this construction is not essential.

The rake apparatus is raised and lowered through the medium of chains or cables 22, secured at their forward ends to the rake-head and passed over and around pulleys 23 and 24, arranged, respectively, upon the upper side of the top rail 5 and rear face of the standards 4, adjacent to the bar 3. The free ends of the chains or cables pass to opposite sides of the stacker and have attached thereto singletrees 25, to which the draft-animals are hitched for operating the rake apparatus. It will be understood that after the stacker is drawn to the place of deposit the draft-animals are attached to the singletrees 25 and driven in opposite directions at right angles to the machine to elevate the rake, and that after the rake is unloaded the animals are backed to lower the same. The opposite pull of the draft-animals serves to steady the machine, so that any anchoring of the same is unnecessary.

It is preferable to always have the rake apparatus lowered in moving the stacker from place to place in order to prevent strain and top-heaviness; but it is necessary to raise the rake a short distance above the surface of the ground to prevent injury thereto by obstructions. It is also desirable to have means for raising the rake for the above purpose from the driver's seat and also for elevating the rake in case of repairs or for other purposes when draft-animals are not available or cannot be conveniently employed. I have therefore provided mechanism for elevating the rake to any desired extent, and this mechanism comprises an operating-lever 26, pivotally mounted at its lower end to the cross-bar 3 and carrying a pawl 27 for engagement with a rack to hold said lever and the rake at any desired elevation. To this lever is pivotally connected one end of an approximately S-shaped link 28, which has its opposite end similarly connected to an arm 29, secured to the rear cross bar or rod connecting the elevating-arms of the rake apparatus. By operating the aforesaid lever the rear end of the rake apparatus will be caused to swing on the pivot-rods 16 and to be raised or depressed, as desired, to throw the rake itself down or up. The lever is located so as to be conveniently manipulated from the driver's seat, as shown in Figs. 3 and 4.

Changes in the form, proportions, and minor details of construction may be made within the scope of the invention without departing from the spirit or sacrificing any of the advantages thereof.

Having thus described the invention, what is claimed as new is—

1. In a hay rake and stacker, a supporting-frame, a rake, arms secured to the rake, means for supporting the front ends of the said arms, connections having longitudinally-spaced pivotal connection with, respectively, the frame and the arms, and means carried by the frame for depressing the rear ends of the arms, as and for the purpose set forth.

2. In a hay rake and stacker, a supporting-frame, a rake, arms having the rake attached thereto, means for supporting the front ends of the said arms, swinging pivotal connections between the arms and frame and having oppositely-projecting bearings journaled, respectively, to the said arms and frame, and means applied to the frame to depress the rear ends of the said arms to effect an elevation of the rake, substantially as set forth.

3. In a hay rake and stacker of the character described, the combination of a wheeled frame, elevatable rake mechanism, pulleys arranged at the top and bottom of the rear of the frame, cables passed over said pulleys and laterally out from the frame and having draft devices applied thereto, a seat at the rear portion of the frame, and mechanism for raising and lowering the rake from said seat.

4. In a hay rake and stacker of the character described, a frame, a rake having pivotal connections therewith, stays having connection with the rake and frame for limiting the upward movement of said rake mechanism, and springs coacting with the stays to effect a cushioning action and partial retraction of the rake mechanism.

5. In a hay rake or stacker of the character described, a frame, a rake having pivotal connections therewith, stays having connection with the rake and frame for limiting the upward movement of said rake mechanism, springs coacting with the stays to cushion and partially retract the rake mechanism, and means for varying the tension of said springs, substantially as set forth.

In testimony whereof I affix my signature in presence of two witnesses.

ANDREW H. GRAVES. [L. S.]

Witnesses:
D. F. SUETHEN,
S. F. SHAW.